United States Patent
Steffen et al.

(10) Patent No.: US 7,500,317 B2
(45) Date of Patent: Mar. 10, 2009

(54) PORTABLE SELF-LEVELING LASER EMITTER WITH PLUMB BEAM

(75) Inventors: Roman Steffen, Rebstein (CH); Detlef Juesten, Sennwald (CH)

(73) Assignee: Hilti Aktiengesellschaft, Schaan (LI)

(*) Notice: Subject to any disclaimer, the term of this patent is extended or adjusted under 35 U.S.C. 154(b) by 56 days.

(21) Appl. No.: 11/879,678

(22) Filed: Jul. 17, 2007

(65) Prior Publication Data

US 2008/0072439 A1    Mar. 27, 2008

(30) Foreign Application Priority Data

Jul. 20, 2006    (DE) ................ 10 2006 000 359

(51) Int. Cl.
 *G01C 15/00* (2006.01)
 *G01C 9/12* (2006.01)
(52) U.S. Cl. .................... 33/291; 33/286; 33/DIG. 21
(58) Field of Classification Search ........... 33/281–283, 33/285–286, 290–291, 227, DIG. 21
See application file for complete search history.

(56) References Cited

U.S. PATENT DOCUMENTS 5,144,487 A * 9/1992 Hersey ............... 33/DIG. 21
5,524,352 A * 6/1996 Rando et al. ............ 33/291
5,619,802 A * 4/1997 Rando et al. ............ 33/291
5,872,657 A * 2/1999 Rando ................. 33/286
6,754,969 B2 * 6/2004 Waibel ................ 33/281
6,763,595 B1 * 7/2004 Hersey ................ 33/286
6,763,596 B1 * 7/2004 Puri et al. ............. 33/286
7,100,293 B2 * 9/2006 Kahle ................. 33/290
7,204,027 B2 * 4/2007 Tacklind .............. 33/286
7,266,897 B2 * 9/2007 Treichler et al. ......... 33/286
7,310,886 B2 * 12/2007 Bascom et al. .......... 33/286
7,392,592 B2 * 7/2008 Bublitz et al. .......... 33/290
2006/0021237 A1 * 2/2006 Marshall et al. ......... 33/290
2007/0271800 A1 * 11/2007 Hersey et al. .......... 33/286

* cited by examiner

Primary Examiner—Yaritza Guadalupe-McCall
(74) Attorney, Agent, or Firm—Abelman, Frayne & Schwab

(57) ABSTRACT

A self-leveling laser emitter (1) has a portable housing (2) in which a beam unit (5) is mounted so as to be swivelable in two dimensions in a self-leveling manner at a bearing point (4) arranged in the area of one third to two thirds of the height (H) of the housing exclusively by the downwardly directed gravitational force (G), which beam unit (5) emits two axis beams (7) in axial directions, including a plumb beam (6), and at least one first beam source is arranged in the beam unit (5) above the bearing point (4) and at least one second beam source is arranged below the bearing point (4).

7 Claims, 2 Drawing Sheets

PORTABLE SELF-LEVELING LASER EMITTER WITH PLUMB BEAM

BACKGROUND OF THE INVENTION

1. Field of the Invention

The invention is directed to a portable laser emitter which emits in at least two axial directions, including the plumb, and which is self-leveling with respect to the gravitational force, particularly to a plumb emitter or a multi-axis laser emitter.

2. Description of the Prior Art

The invention is limited to portable plumb emitters or multi-axis laser emitters with visible point beams or cross-shaped beams which are immovable in the self-leveled state which is effected entirely by gravitational force. They are used particularly in the construction industry for a stable determination with respect to the coordinate origin and coordinate direction of a temporary local Cartesian coordinate system. Accordingly, the invention is explicitly not directed to laser emitters with actively movably deflected laser beams such as, for example, rotary lasers, because the latter have insufficient stability over the long term.

German Utility Model DE20100041U discloses a plumb emitter which is oriented to the earth's gravitational field and which has an upwardly directed vertical point beam. The laser beam source is arranged below the tip bearing.

European Publication EP0715707 discloses a multi-axis laser which is oriented to the earth's gravitational field. Two of the five point beams in each instance define a horizontal and vertical plane, respectively, of a half-space.

According to U.S. Pat. No. 5,539,990, instead of point beams, beam bundles which are fanned out horizontally and vertically in a flat manner are emitted on multiple axes as cross-shaped beams. In the following, both beam variants are embraced by the expression 'axial beam'.

According to U.S. Pat. No. 5,144,487, a two-axis gimbal joint is arranged on top in the portable housing in a five-beam multi-axis laser emitter. The laser beam source, arranged at the bottom, and the beamsplitter are point-supported at the two-axis gimbal joint and movably suspended in a self-leveling manner by gravitational force. When the multi-axis laser emitter is appropriately mounted at a reference point on a roughly leveled building area, the projected plumb point of the plumb beam of the Cartesian coordinate system on the building area wanders away from the reference point by a correction distance depending on the self-leveled correction angle. If the correction distance is not sufficiently small, the multi-axis laser emitter must be displaced and must level itself again.

Further, according to European Publication EP1026476, in a two-beam multi-axis laser emitter without a plumb beam, a two-axis gimbal joint is arranged at an axis which projects by approximately one half of the height of the housing. Two laser beam sources, which are arranged at the bottom and are perpendicular to one another, are point-supported at the two-axis gimbal joint and are movably suspended in a self-leveling manner by gravitational force.

SUMMARY OF THE INVENTION

It is the object of the invention to reduce the correction distance of the plum beam in a portable self-leveling laser emitter.

This and other objects of the present invention, which will become apparent hereinafter, are achieved by providing a self-leveling laser emitter having a portable housing in which a beam unit is mounted so as to be swivelable in two dimensions in a self-leveling manner at a bearing point arranged in the area of one third to two thirds of the height of the housing exclusively by the downwardly directed gravitational force, which beam unit emits two axis beams in axial directions, including a plumb beam, and at least a first beam source is arranged in the beam unit above the bearing point, and at least a second beam source is arranged below the bearing point.

Accordingly, a laser emitter which is formed, for example, as a plumb emitter, emits an axis beam vertically upward with the first beam source and emits an axis beam vertically downward with the second beam source. Since at least the first beam source is arranged above the bearing point, its free space can be used to reduce the height of the bearing point in the housing. Since, for reasons of trigonometry, at a given correction angle, the correction distance is proportional to the height of the bearing point above the building area on which the laser emitter with the housing is mounted, this correction distance is shorter.

The beam unit is advantageously supported at the bearing point by a two-axis gimbal joint so that a low-friction, reaction-free, sufficiently robust bearing support with two-dimensional swiveling degrees of freedom is realized.

The laser emitter advantageously has three axis beams in axial directions perpendicular to one another so that a multi-axis laser emitter is formed which defines a Cartesian coordinate system.

The multi-axis laser emitter advantageously has at least five axis beams so that a complete half-space is defined in Cartesian coordinates.

In an advantageous manner, at least two beam sources each emit a light beam bundle in a common axial direction, these light beam bundles being fanned out in a flat manner and extending perpendicular to one another, so that this axis beam is formed as a cross-shaped beam.

At least one beam source advantageously has collimating optics with a laser diode and collimating lens so that sharply focused laser beams which are visible from a distance are generated.

At least one beam source advantageously has a beamsplitter for generating a plurality of axis beams which extend perpendicular to one another so that the quantity of required collimating optics is less than that of the axial directions.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
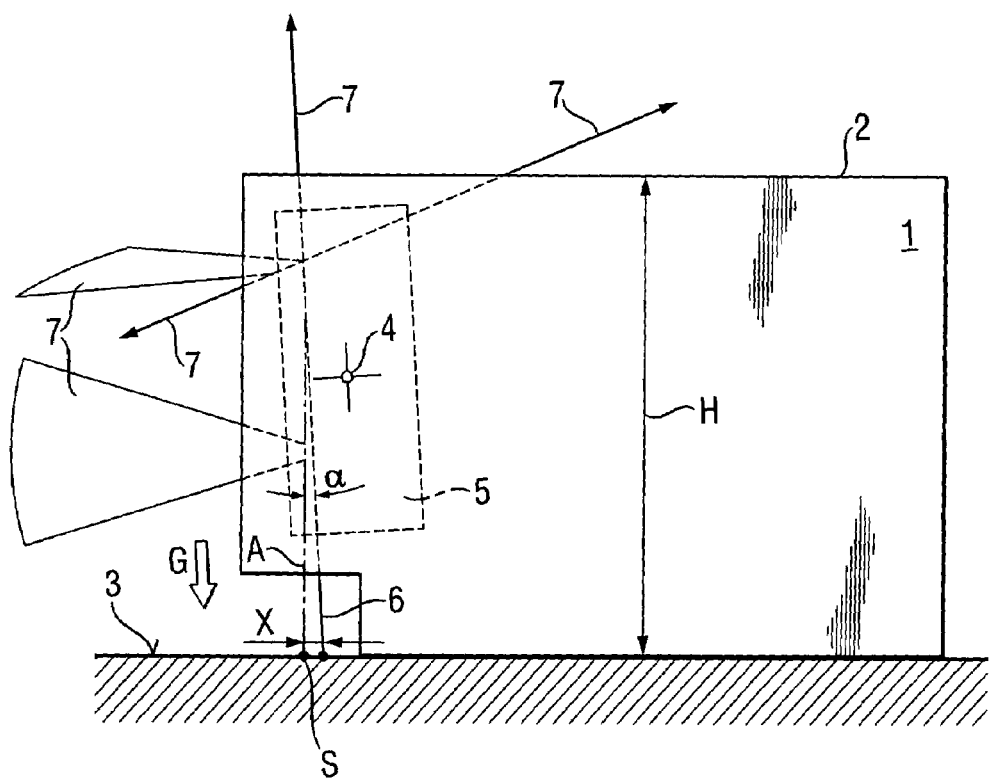
FIG. 1 a schematic view of a laser emitter.

According to FIG. 1, a self-leveling laser emitter 1 has a portable, substantially prism-shaped housing 2 which is mounted on a slightly inclined base surface 3. A beam unit 5 is mounted in a swivelable manner at a bearing point 4 arranged at one half of the height H of the housing 2. The beam unit 5 emits five visible axis beams 7 in axial directions perpendicular to one another, including a plumb beam 6. With the downwardly directed plumb beam 6 and the upwardly directed axis beam 7, the laser emitter 1 at the same time forms a plumb emitter and, together with the horizontal axis beams 7, a multi-axis laser emitter. The axis beam 7 is formed as a cross-shaped beam having a horizontally and vertically fanned out beam bundle in one axial direction (at left in the drawing), and as a point beam in all of the other axial directions. The beam unit 5 is deflected at a correction angle α in a self-leveling manner exclusively through the downwardly directed gravitational force G for the non-leveled mounting beam A so that the plumb beam 6 is displaced on the building area 3 by a correction distance X with respect to the mounting beam A which served to position the multi-axis laser emitter 1 when mounting at a reference point S.

Figure 2:
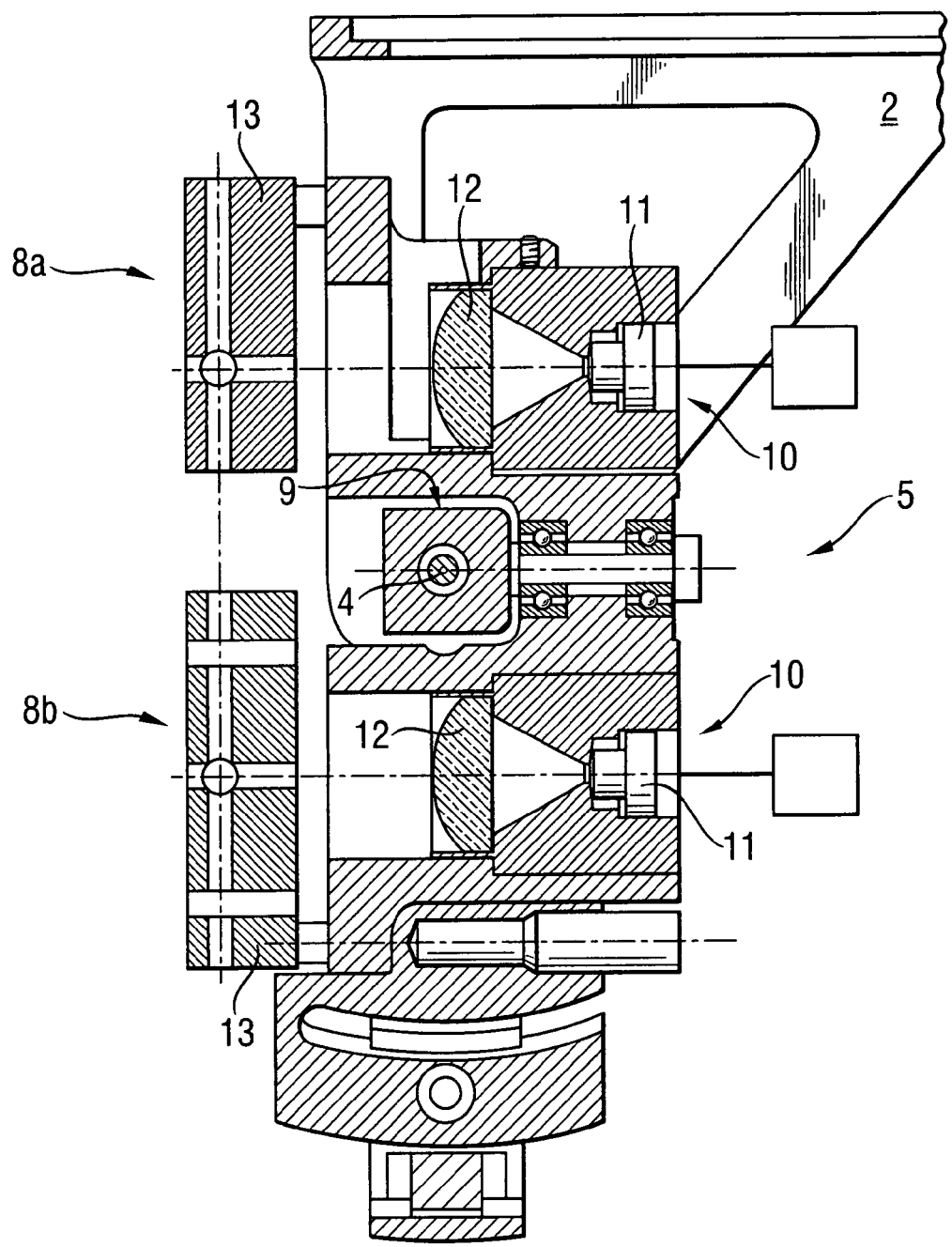
FIG. 2 a longitudinal cross-sectional view of a beam unit.

According to FIG. 2, a first beam source 8a is arranged above the bearing point 4 and a second beam source 8b is arranged below the bearing point 4 in the beam unit 5 which is swivelably mounted at the housing 2 by a two-axis gimbal joint 9. Each of the two beam sources 8a, 8b haves collimating optics 10 with a laser diode 11 and collimating lens 12 and a beam splitter 13.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A self-leveling laser emitter, comprising a portable housing (2); a beam unit (5) mounted in the housing (2) so as to be swivelable in two dimensions in a self-leveling manner at a bearing point (4) arranged in an area of one third to two thirds of the height (H) of the housing exclusively by the downwardly directed gravitational force (G), the beam unit (5) emitting two axis beams (7) in axial directions, including a plumb beam (6); and at least one first beam source (8a) arranged in the beam unit (5) above the bearing point (4) and at least one second beam source (8b) arranged below the bearing point (4).

2. A laser emitter according to claim 1, wherein the beam unit (5) is supported at the bearing point (4) by a two-axis gimbal joint (9).

3. A laser emitter according to claim 1, wherein the beam unit (5) emits at least three axis beams (7) in axial directions perpendicular to one another.

4. A laser emitter according to claim 3, wherein the beam unit (5) emits five axis beams (7).

5. A laser emitter according to claim 3, wherein the at least first and second beam sources (8a, 8b) each emits a light beam bundle in a common axial direction, the light beam bundles being fanned out in a flat manner and extending perpendicular to one another.

6. A laser emitter according to one of claim 1, wherein the at least one first beam source (8a) and the at least one second beam source (8b) each has collimating optics (10) with a laser diode (11) and collimating lens (12).

7. A laser emitter according to claim 6, wherein the at least one first beam source (8a) and at least one second beam source (8b) each has a beamsplitter (13) for generating a plurality of axis beams.

* * * * *